(12) United States Patent
Haseltine et al.

(10) Patent No.: US 6,578,015 B1
(45) Date of Patent: Jun. 10, 2003

(54) METHODS, DEVICES AND SYSTEMS FOR ELECTRONIC BILL PRESENTMENT AND PAYMENT

(75) Inventors: Mark E. Haseltine, San Francisco, CA (US); Roberto Irribarren, Fremont, CA (US); Yash Pal Talreja, Fremont, CA (US); Mohan K. Arthur, Fremont, CA (US); Siddhartha Agarwal, Redwood Shores, CA (US); Mohit Doshi, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/386,760

(22) Filed: Aug. 31, 1999

(51) Int. Cl.$^7$ .............................................. G06F 17/60
(52) U.S. Cl. .............................. 705/34; 705/40; 705/42
(58) Field of Search ............................ 705/34, 40, 42

(56) References Cited

U.S. PATENT DOCUMENTS

| | | | | |
|---|---|---|---|---|
| 5,383,113 A | * | 1/1995 | Knight et al. ................ | 364/401 |
| 5,465,206 A | * | 11/1995 | Hilt et al. ................... | 364/406 |
| 5,649,117 A | * | 7/1997 | Landry ........................ | 395/240 |
| 5,655,089 A | | 8/1997 | Bucci | |
| 5,699,528 A | * | 12/1997 | Hogan ........................ | 395/240 |
| 5,963,925 A | * | 10/1999 | Kolling et al. ................ | 705/40 |
| 6,049,786 A | * | 4/2000 | Smorodinsky ............... | 705/40 |
| 6,078,907 A | * | 6/2000 | Lamm ......................... | 705/40 |
| 6,128,603 A | * | 10/2000 | Dent et al. ................... | 705/40 |
| 6,173,272 B1 | * | 1/2001 | Thomas et al. ............... | 705/42 |
| 6,202,054 B1 | * | 3/2001 | Lawlor et al. ................ | 705/42 |
| 6,208,974 B1 | * | 3/2001 | Campbell et al. ............. | 705/3 |
| 6,233,565 B1 | * | 5/2001 | Lewis et al. .................. | 705/35 |
| 6,334,116 B1 | * | 12/2001 | Ganesan et al. .............. | 705/34 |

FOREIGN PATENT DOCUMENTS

| | | | | |
|---|---|---|---|---|
| JP | 57-101980 | * | 6/1982 | ................ 705/40 |
| WO | 00/48102 | * | 8/2000 | ................ 405/40 |

OTHER PUBLICATIONS

Martin, Declan, Jan. 1997, Business & Industry, ISSN: 1353–9825 (United Kingdom), whole document.*

* cited by examiner

*Primary Examiner*—Michael Cuff
(74) *Attorney, Agent, or Firm*—Young Law Firm, P.C.

(57) ABSTRACT

A computer-implemented method of presenting an electronic bill from a biller to a customer over a computer network includes steps of receiving biller-originated bill data and bill format data over the network into a bill presentment and payment database. The inputted bill data and bill format data are then stored in a first area of the bill presentment and payment database. The stored bill data and/or the bill format data is then validated and the validated bill data and/or the format data is swapped from the first area to a second area of the bill presentment and payment database, the second area being accessible to the customer. The bill, now incorporating the validated bill data and formatted according to the bill format data, may then be presented to the customer. A third, customer accessible area may be included in the database to archive the bills. The bill format data may include a plurality of bill templates, each of which may define a distinct appearance for the bill. A plurality of bill template selection rules may be applied to the validated bill data. Based on this evaluation, one of the plurality of bill templates may then be selected to format the bill presented to the customer.

52 Claims, 6 Drawing Sheets

METHODS, DEVICES AND SYSTEMS FOR ELECTRONIC BILL PRESENTMENT AND PAYMENT

BACKGROUND OF THE INVENTION

1. Field of the Invention

This invention relates to the electronic presentment and payment of bills. In particular, the present invention relates to methods, devices and systems that provide a powerful, automated and flexible infrastructure for electronically presenting, processing, viewing and paying bills and other requests for payment over a computer network, such as the Internet.

2. Description of the Related Art

Conventional methods for the receipt, payment and processing of bills derive from the nature of the bills themselves. Paper bills, such as those generated by billers such as utilities, credit card and mortgage companies, for example, must be printed, stuffed into envelopes, stamped or otherwise metered and delivered. Once received, the consumer most often writes a paper check, fills out a paper bill stub, stuffs both in an envelope, affixes postage, and drops off the payment with the post office to be delivered to the biller. The biller, or a designated payment processor contracting with the biller, receives the paper bill payment, records the payment and deposits the check with a financial institution, whereupon the check is sent to a clearinghouse for further processing. Ultimately, the customer's account is debited for the amount of the check and the biller's account is correspondingly credited.

Figure 1:
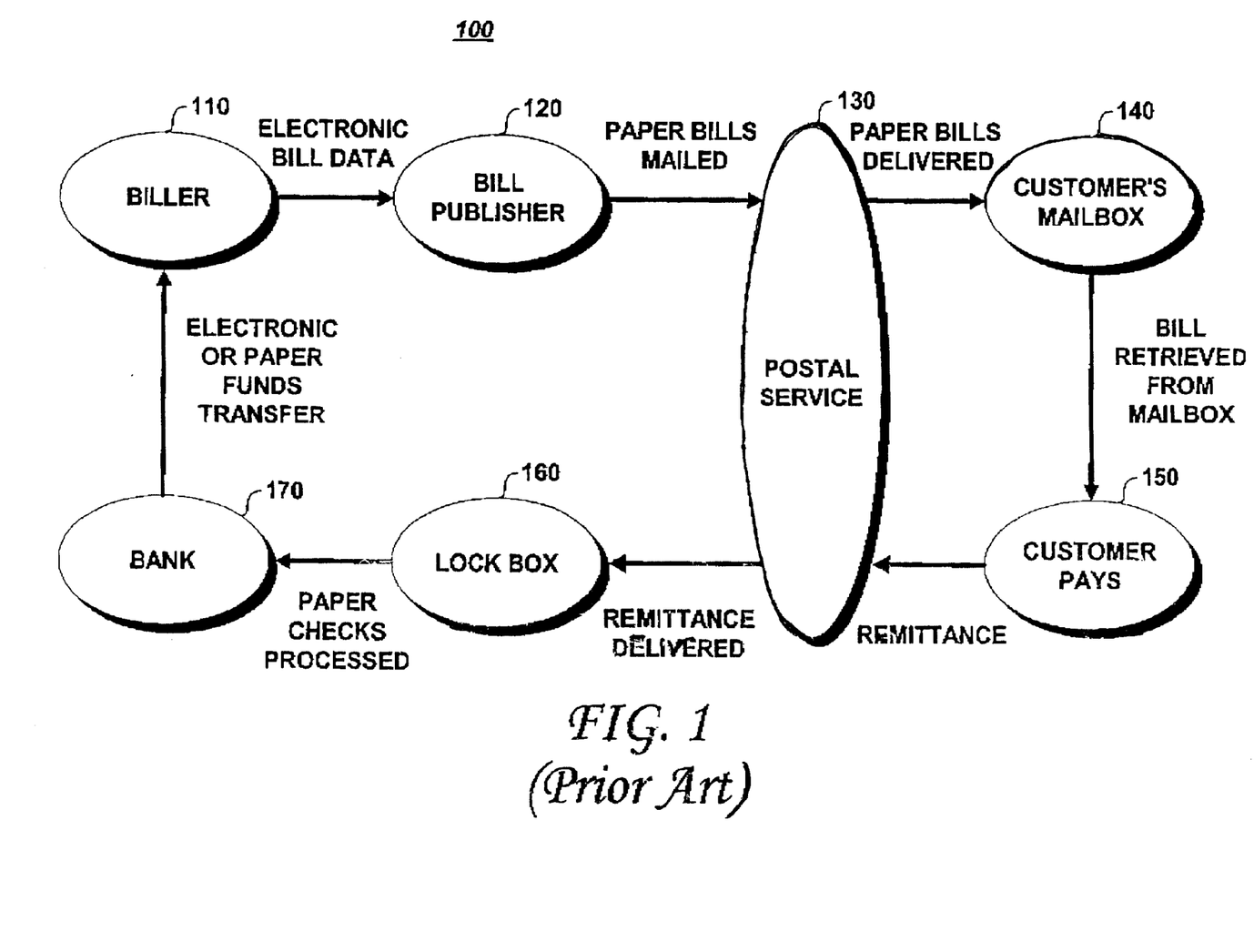
FIG. 1 shows an example of a paper-based bill generation and payment cycle.

FIG. 1 shows an example of a paper-based bill generation and payment cycle 100. As shown therein, the cycle 100 may include a biller 110 electronically sending bill data to a bill publisher 120. The bill data may include the customer's name, address, amount due, due date, together with any other relevant information, such as the current outstanding balance. The bill publisher 120 then prints out the bills using the biller's data and bill forms. The printed bills may then be mailed and physically delivered to the customer's mailbox 140, most often via the postal service 130. The customer then retrieves the bill from his or her mailbox and eventually remits (at reference 150) the amount due (or some fraction thereof), most often by writing a paper check. The remittance is then stuffed into an envelope, mailed and delivered, most often via the postal service 130, to the biller's lock box 160. A bank or other payment processor 170 then retrieves the payment, processes same and causes the payment to be debited from a customer account and credited to a biller's account, either by electronic or paper funds transfer.

As may be appreciated, the paper-based bill generation and payment cycle 100 depicted in FIG. 1 is often both a lengthy and costly process. To quantify the cost of this reliance upon paper bills, it has been estimated that over 18 billion paper bills are generated annually, at about $1.00 to about $1.50 per paper bill. Moreover, it is estimated that the aggregate processing cost for these paper bills reaches about $14 billion annually. Of these paper bills, the majority are generated by credit card companies and the vast majority of these bills are settled by means of paper checks.

Other payment modalities exist. For example, it is now possible to pay some bills by authorizing the biller to issue a telephone check or to electronically transfer funds. Moreover, certain online payment options are emerging, allowing customers to pay bills electronically. Such online payment services often must print out and mail a paper check to those billers not equipped to accept an electronic form of payment. However, a major obstacle to the widespread adoption of electronic bill payments thus far has been the absence of an effective, reliable, convenient and secure bill presentment infrastructure. Such an infrastructure should allow customers to be presented with and view bills as they would normally appear, in the same or a similar format as their familiar paper counterparts. The customers should then have the ability to view a summary and/or a detailed form of the bill and have a number of options available (such as to schedule bills for auto-payment, for example) to pay the bill electronically. Such an infrastructure should also allow the billers to exercise complete control over the appearance of the bills presented to the customers, and allow a simple and flexible means of uploading, storing and presenting their billing data to their customers. What are needed, therefore, are tightly integrated methods, devices and systems for electronically presenting bills to customers while preserving the billers' corporate identity. Such methods, devices and systems should also allow customers to view and pay such bills without the disadvantages associated with conventional electronic payment systems and/or paper bills and checks.

Bill consolidators exist, which allow customers to electronically log onto a single site on the World Wide Web (hereafter Web) and pay bills originating from a number of individual billers. For example, a customer might log onto a consolidator's Web site and pay their electric bill, their telephone and their cable bill. Such consolidators may be generally categorized as thin consolidators or thick consolidators. Thin consolidators typically carry only bill summaries and refer the customer to the biller's own Web site for further detailed bills and/or further customer service, such as to discuss a disputed bill. Thick consolidators typically carry the biller's entire customer data and often act as their own payment processors. In the thick consolidator case, the biller's involvement in the presentment and payment process may be limited to providing the thick consolidator with the necessary customer bill data and collecting the payment after the customer payment has been received and processed. However, no complete solution is believed to exist to allow thick and/or thin consolidators to preserve the "look-and-feel" of their billers' bills while providing the customer with a flexible and integrated bill presentment and payment infrastructure.

SUMMARY OF THE INVENTION

It is an object of the present invention, therefore, to provide methods, devices and systems for electronically presenting bills to customers while preserving the billers' corporate identity, as embodied in the "look-and-feel" of the bills presented to customers. It is another object of the present invention to provide methods, devices and systems to allow customers to view and pay electronic bills in a flexible manner, without the disadvantages associated with conventional electronic payment systems and/or paper bills and checks.

In accordance with the above-described objects and those that will be mentioned and will become apparent below, a computer-implemented method of presenting an electronic bill from a biller to a customer over a computer network, according to an embodiment of the present invention, comprises the steps of receiving biller-originated bill data and bill format data over the network into a bill presentment and payment database; storing the inputted bill data and bill format data in a first area of the bill presentment and payment database called the loading and staging area; validating at least the stored bill data; swapping the validated bill data and the format data from the first area to a second area of the bill presentment and payment database, the second area, called the active area, being accessible to the customer; and presenting the bill to the customer, the presented bill being formatted according to the format data and incorporating the validated bill data.

According to an embodiment of the present invention, the method may further comprise storing historic information of bills in a third, customer accessible area of the bill presentment and payment database called the active area. The bill format data may include a plurality of bill templates, each of the bill templates defining a distinct appearance for the bill. A plurality of bill template rules may be evaluated based upon the validated bill data and one of the plurality of bill templates may be selected to format the bill presented to the customer. For example, one of the bill template selection rules may compare a current date with a due date of the bill. A plurality of auto pay rules may be evaluated to determine whether a request for payment should be automatically generated after the validated bill data and the format data has been swapped from the first area to a second area of the bill presentment and payment database. The bill data may be arranged in the first area as at least one database table, which may be swapped into the second area after the bill data is validated. For example, the aforementioned database table (s) may include a bill summary table and a bill detail table. A status table may be generated for the bill, to indicate the current status of the bill. Both the bill data and bill format data may originate from a plurality of billers, each biller of the plurality inputting its own bill data and its own biller-specific bill format data. A step of maintaining an activity log of biller-specified predefined business events and of generating a notification upon an occurrence of one of the biller-specified predefined business events may also be carried out. An audit trail record may be maintained of all or selected table-affecting events within the bill presentment and payment database. Each customer may be represented in the bill presentment and payment database as a user account, each user account including a biller account for each biller from whom the customer receives bills, a list of which payment instruments the customer uses to pay the billers and at least one biller-definable flexible field. A plurality of customers may be registered simultaneously into the bill presentment and payment database in a batch mode by loading XML or OFX-formatted customer data into the first area via Hypertext Transfer Protocol (http) or by file transfer, via File Transfer Protocol (ftp). According to further embodiments, the present invention may also be viewed as a computer system implementing the above detailed method and a computer readable medium having data stored thereon representing sequences of instructions which, when executed by a computer, causes said computer to perform the above-detailed steps.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

Functional Overview

Figure 4:
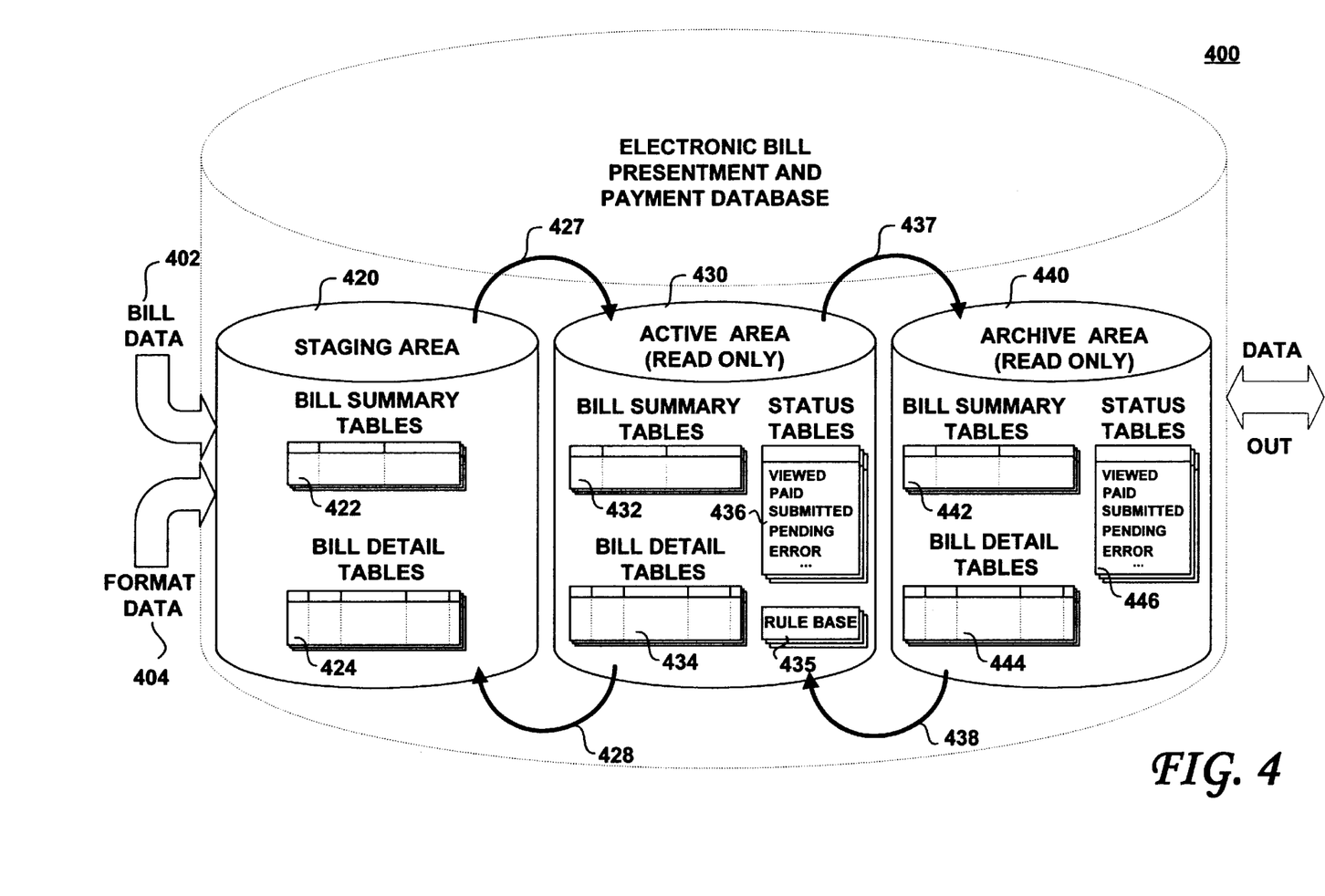
FIG. 4 is a block diagram illustrating a structure of a database for electronic bill presentment and payment, according to an embodiment of the present invention.

The present invention includes electronic bill presentment and payment methods, devices and systems. As shown in FIG. 4, the present invention may be implemented as a database 400 comprising a first, second and third areas 420, 430 and 440, respectively. In the description to follow, the first area 420 may also be referenced as a staging area, the second area 430 as an active area and the third area 440 may be referenced as an archive area, for reasons to be detailed below. As shown in FIG. 4, the staging area 420, the active area 430 and the archive area 430 each may be a sub-database of the database 400 or each may be a functionally separate database linked to one another at least in the manner shown by the arrows 427, 428, 437 and 438.

According to the present invention, billers (e.g., bill-generating entities, such as credit card companies, utilities, mortgage companies, for example) have the option of transmitting bill data 402 and/or bill format data 404 to the electronic presentment and payment database 400. The bill data 402 may include, for example, a customer identifier, an amount due and a date due for each of the biller's customers that have opted to pay their bills electronically. Other information may also be included in the bill data 402 including, for example, account balance, minimum payment and customer service information, for example. The bill data stream 402 may be coded according to any number of formats such as, for example, the Open Financial Exchange (OFX) format (available at the OFX home page on the World Wide Web), the specification of which is incorporated herewith by reference. OFX is a broad-based framework for exchanging financial data and instructions between customers and their financial institutions. Other formats for the bill data stream 402 may include ASCII, eXtensible Markup Language (XML), print streams or other legacy or proprietary formats. Appropriate translators may be positioned between the bill data 402 and the staging area 420 to insure a uniform format for the incoming bill data stream 402. For example, a format translator(s) may be incorporated in an application program interface (API) disposed at the input of the staging area 420, for example. The bill data stream 402 may include summary and/or detail bill data on each customer, for each biller. The bill format data 404 may include HTML-formatted data configured to mimic the "look-and-feel" of the biller's traditional paper bills, when rendered on a display device. For example, the biller's fonts, background color scheme, graphic design(s) and/or layout may be reproduced in the bill format data 404. Alternatively, additional visual cues may be incorporated in the bill format data 404 that are not possible using paper bills. For example, flashing backgrounds or other animation may draw the customer's attention to a particular area of his or her computer screen as the bill is displayed. Alternatively, or in addition to HTML, the bill format data 404 may include functionality programmed in Extensible Markup Language (XML). A Java language program may also be developed to read such XML-formatted bill format data 404 and/or bill data stream 402 to generate an input stream suitable to be loaded into a database (such as an Oracle Corp. database, for example), via mechanisms such as Oracle's SQL*Loader utility or other Relational Database Management System (RDBMS) utilities.

The bill data 402 may include bill summary data and/or bill detail data, among other information. According to an embodiment of the present invention, the bill summary data and the bill detail data may be logically organized as tables, such as shown at references 422 and 424 in the staging area 420. A bill data validation procedure may be carried out to insure the integrity of the bill data 402 transmitted by the biller. This validation procedure may include, for example, verification of the customer's identity, verification of the integrity of the transmitted data and/or verification that all required fields (such as amount and/or date due, for example) have been properly populated. If a problem occurs during the loading of the bill data 402 and/or the bill format data 404, the data may be dropped, to prevent corrupted data from being swapped from the staging area 420 to the active area 430. Likewise, should an error be discovered during the validation process, the bill data 402 and/or the bill format data 404 may be purged from the staging area 420. Preferably, customers should not have access to the staging area 420 of the bill presentment and payment database 400.

Once the bill data 402 and/or the bill format data 404 loaded into the staging area 420 has been validated, it may be swapped into a portion of the active area 430 of the database 400 through a workflow process that swaps database partitions. The workflow process allows the bill data 402, after validation, to be loaded quickly in the active area 430. According to an embodiment of the present invention, the partitioning process may be carried out according to the parameters set out, for example, in chapter 8 of *Oracle8 Server Concepts*, release 8.0© 1997 Oracle Corporation (or later versions thereof), which publication is incorporated herein by reference in its entirety. System administrators may review the bills before they are swapped into the active area 430 from the staging area 420. Unlike the staging area 420, customers may have access to the active area 430, and may view (only) their own bill data 402 therein, as formatted by the bill format data 404. Within the active area 430, the customer may view summary bills (tables 432) and/or detailed bills (tables 434) from billers. Status tables 436 may also maintained in the active area 430 and may be viewed by customers. As the name implies, the status tables 436 track the status of the bills presented to the customers in the active area 430. For example, the status tables 436 may track whether a customer's bills have been viewed, paid, have been submitted or are pending. Other indicia indicative of the status of the customers' bills may also be included in the status tables 436.

Functionality may be provided to allow customers to dispute bills by sending a (e.g. email) message to a customer service representative. The biller of the disputed bill may then log onto the system 400 and take appropriate action, such as canceling, modifying or reinstating the bill, for example. Other means of allowing customers to effectively dispute bills may also be readily implemented.

According to the present invention, the active area 430 may incorporate functionality to automatically pay bills stored therein. Toward that end, the active area 430 may include rule base 435 including a plurality of auto pay rules that operate upon the bill data 402 to determine which customer bills should be automatically paid. The auto pay rules (which may be customer-defined) may be invoked upon swapping the bill data 402 and/or the formatting data 404 into the active area 430. The auto pay rules may evaluate a number of criteria to determine whether a customer's bill should be automatically paid. For example, the customer may define auto pay rules to suit his or her payment preferences. For example, a customer may direct that all bills under $100 from specified billers should be paid automatically on the $15^{th}$ of each month. If the criteria embodied in the auto pay rules are satisfied, the customer need not login to the database 400 to pay those bills for which the auto pay functionality has been activated. Preferable, the bill auto pay rules integrate national holidays to calculate auto-payment dates and bill due dates. Such auto pay rules will vary from country to country, as the national holidays and operation of the local postal service vary from country to country. If the bill auto pay rules determine that payment is to take place, then a payment request may be generated and sent to a payment processor, if a payment processor is used. The payment processor, in turn, may have a number of rules that must be satisfied or may have a number of constraints placed upon it in order to pay the biller. For example, the payment processor may require a credit card number or may require further authorization (pre-noted or not) to debit the customer's account and to correspondingly credit the biller's account. According to an embodiment of the present invention, all payment requests are queued by date. Each day (or more often, if necessary), a job may be run to query the active area 430, to ascertain which payment request(s) (if any), should be processed that day. Those payment requests that should be processed may then be sent to a payment processor, such as, for example, CyberCash Inc. Thus, payment requests may be queued for a relatively long period of time before they are processed. During this time, customers may modify the amount and/or date, for example, of the payment. However, since the active area 430 is preferably read only, neither the billers nor the customers should be able to edit the bills stored therein. Should billers wish to modify a bill in any way, the bill in question should preferably be purged from the active area and a new bill should be loaded into the staging area 420 in the manner discussed above.

Bills may remain in the active area 430 for a period of time specified by the biller. As bills are paid, or after a request from the biller, selected customer bills may be moved to the archive area 440 of the bill presentment and payment database 400. The archive area 440 may include bill summary tables 442, bill detail tables 444 and bill status tables 446, each of which may be organized in a similar manner to their counterparts in the active area 430. As is the active area 430, the archive area 440 is preferably read only, to prevent both billers and customers form editing the bill data stored therein. The archive area 440, however, may be customer accessible. For example, customers may query the archive area 440 and request, for example, the bills from a particular biller over the past 12 months. As indicated by the arrow 438, archived bills may also be re-loaded into the active area 430, again through a workflow process that swaps partitions, as detailed above.

The active area 430 may also include notification functionality adapted to generate and send an email, for example, to the customers when new bills have been posted within the active area 430 of the bill presentment and payment database 400. Email notification, according to the present invention, is only one of many different forms such a notification may take. In this manner, customers will know when to log onto the database 400 to view and/or pay their bills. The notification may include any degree of specificity as the billers and/or the consolidators choose. Moreover, the email notifications may include links Web-enabled links to the database 400 that will bring the customer directly to their bills, after proper authentication.

Figure 5:
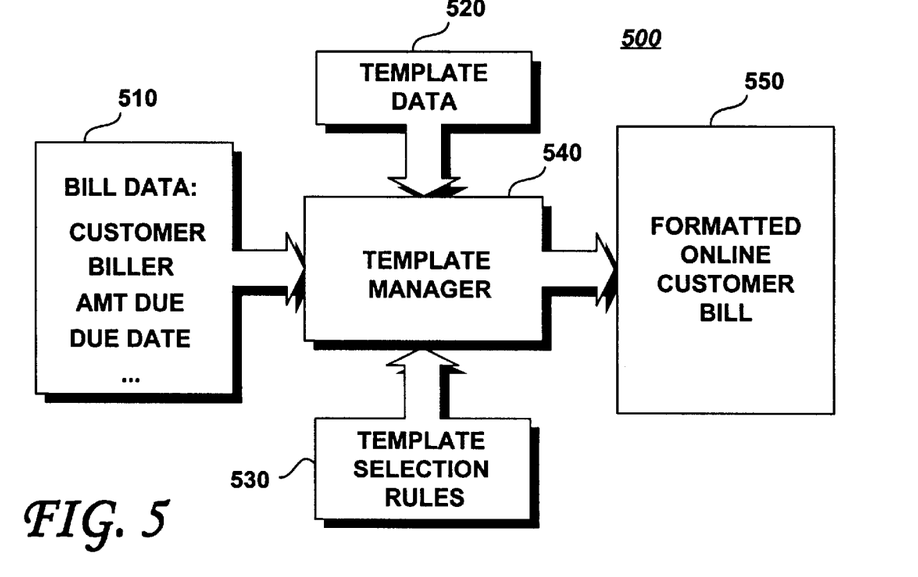
FIG. 5 is a block diagram of the dynamic template generation for bill presentment, according to an embodiment of the present invention.

FIG. 5 is a block diagram of a dynamic template generation system 500 for bill presentment, according to an embodiment of the present invention. The present invention allows the appearance of the bill presented to the customer (in the active area 430 and/or the archive area 440 of the database 400) to be changed at least depending upon the originating biller and the current state thereof. Such states may include, for example, whether the bill is current, past due, in collection or about to enter collection. For each of these states, the bill may take on a distinct appearance. As shown in FIG. 5, the template manager 540 receives a number of inputs, including the bill data 510, the template data 520 and the template selection rules 530. The bill data 510 may include the bill data 402 of FIG. 4 and/or additional bill data. For example, the bill data 510 may include a number of fields such as customer, biller, amount due and due date, for example. The template data 520 may consist of or include at least the bill format data 404 of FIG. 4. The template data 520 may include, for example, HTML-formatted data, Java logic for database access and logic such as SunSoft's JavaServer Pages (JSP) 1.0 standard (incorporated herewith by reference in its entirety) or Java-based precompiled Java classes to define the appearance of the bill, although the present invention may readily be adapted to support other data formats.

The template data 520 may include separate bill templates for current, past due and bills that are in or about to be transferred to collection. The template data 520 may also include, for example, messages or advertisements selected by the consolidator and/or biller. The template selection rules 530 may include a series of rules which, when evaluated collectively by the template manager 540, cause the selection of an appropriate template from the template data 520. The selected template, in turn, dictates the ultimate appearance of the bill. The template manager 540, therefore, may receive the bill data 510 and apply the template selection rules for that biller and/or customer to the received bill data 510. Based upon the result of the application of the template selection rules 530 to the bill data 510, the template manager 540 may select an appropriate bill template from the template data 520 (or invoke an appropriate Java-based method) to generate a formatted online bill 550 for the customer to display on his or her display device. The template manager 540, for example, may be invoked within the active area 430 of the database 400 of FIG. 4 when the customer logs on to view his or her bills. For example, the template selection rules 530 may include a template selection rule that compares the system date (i.e., the present date) with the bill due date and cause the template manager 540 to select a biller-specific "overdue bill template" when the system date is greater than the bill due date and a "current bill template" otherwise. The template manager may also evaluate Boolean expressions such as AND, OR etc. to select a template that is appropriate to the bill data 510. For example, should the system date be greater than the due date and the amount due exceed a predetermined threshold, then the bill might be formatted differently than would be the case if the amount due did not exceed the predetermined threshold. Highly targeted advertising might be included on the customer's bill, based upon the result of the template manager's 540 evaluation of the template selection rules 530.

The dynamic template generation system 500, according to an embodiment of the present invention, may also incorporate means for altering the template data 520 and/or the template selection rules 530, based upon a predetermined privilege level. In this manner, the biller's system administrator, for example, may remotely change the appearance and general look-and-feel of the bills to be displayed and/or the underlying template selection logic. Programming logic for such dynamic HTML generation may be provided by mechanisms such as, for example, JSP. The dynamic template generation according to the present invention, therefore, may be seen as a means of extending the functionality of the present invention to meet the billers' business needs.

Figure 3:
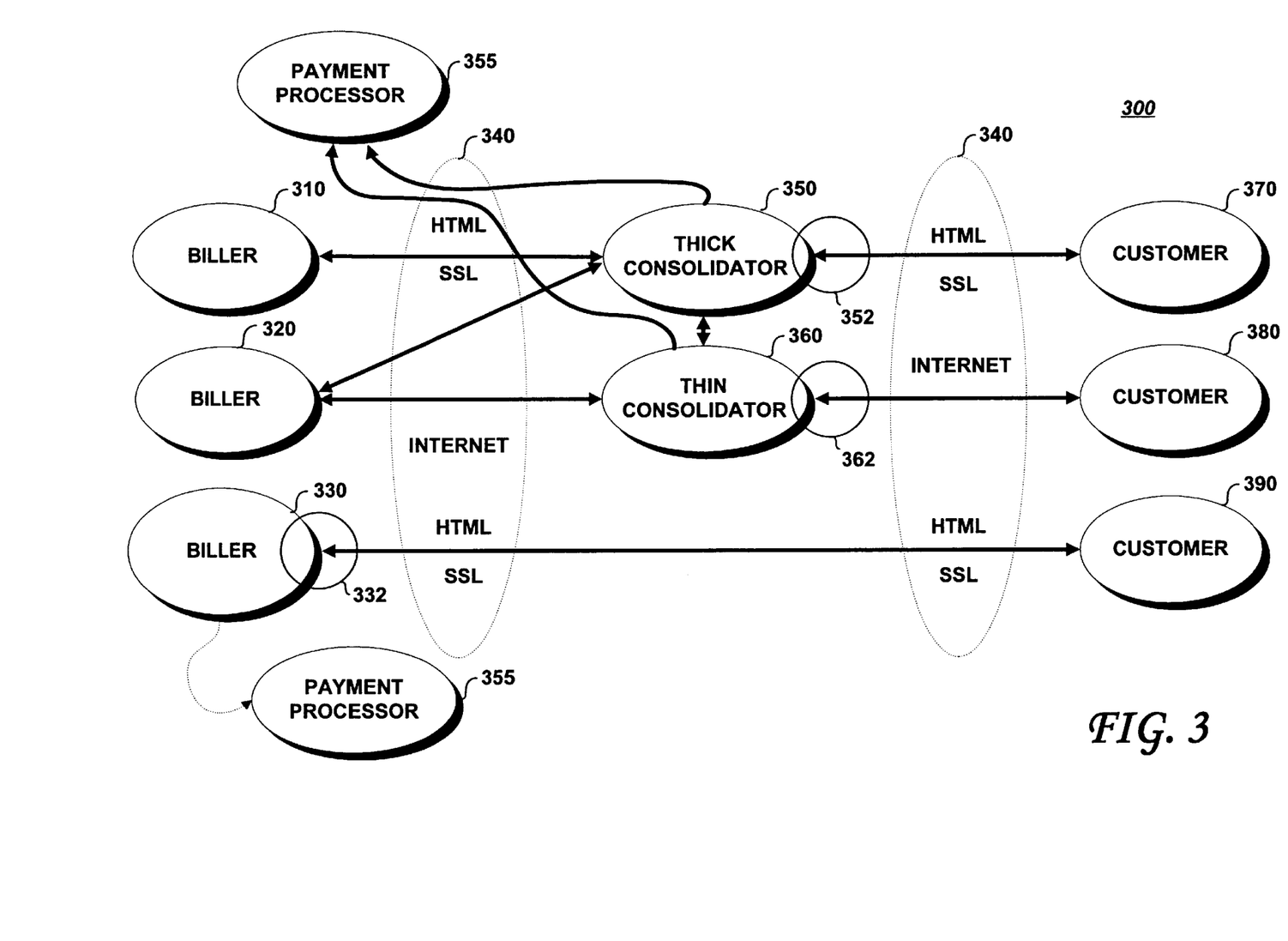
FIG. 3 is a conceptual diagram illustrating the relationships between billers, customers, consolidators and payment processors, according to an embodiment of the present invention.

Customers wanting to view and pay bills may register themselves by accessing an HTML registration page. Alternatively, billers may supply the necessary customer information and enroll or register customers in a batch mode by loading the customer data into an interface provided in the staging area 420 over the Web via Hypertext Transfer Protocol (http) or by file transfer, via File Transfer Protocol (ftp), for example. Customer data may be expressed in XML and/or conform to the OFX protocol, for example, at the billers' option. For example, bill summaries and bill details may be defined as formatted according to the OFX protocol, and present the resulting bills over http or as a file transfer over ftp. Once enrolled, customers may access the main "login" Web page for the bill presentment and payment service. To identify the customer to the bill presentment and payment database 400, the customer may be assigned an account number and may be assigned or allowed to choose a password. This combination of account number and password uniquely identifies that customer and allows the customer's bills to be presented and paid electronically. Other means of identifying the customer may also be employed, such as, for example, digital certificates or customer biometric data (fingerprints, retinal scans, voiceprints, etc.). According to the present invention, each customer may be represented as a unique user account, each unique user account including a plurality of biller accounts, one such biller account for each biller from whom the customer receives bills. The user account information stored also includes, according to the present invention, a list of which payment instruments (account numbers, credit card numbers, etc.) the customer uses to pay the billers. The user account, therefore, defines a profile that is specific to each user or customer. The user account, moreover, may be customized by means of flexible fields, by which billers can define fields that may be unique to their business. For example, a utilities biller may include a field in the user account specifying where the customer's meter is located, or a telephone company biller may use the flexible fields to list the customer's facsimile number. The rationale for including such flexible fields in the user account is to provide a flexible, expandable and customizable framework that is modifiable at will to meet the billers' bill format and business model. Indeed, it is quasi impossible to anticipate each attribute of each field for each biller desiring to utilize the bill presentment and payment system according to the present invention. FIG. 3 is a graphical representation of the relationship and a few of the possible communication paths in a network 300 including billers, customers, consolidators and payment processors, according to an embodiment of the present invention. As shown therein, a customer 390 may log onto a Web site of a biller 330 (as graphically represented at reference 332) through the Internet 340 via, for example, an HTML Secure Sockets Layer (SSL), for example. SSL is a high-level security protocol that insures security of data transmitted over the Internet, and is well known and used by many commerce servers on the Web. Popular Web Browsers, such as the Netscape Navigator®, currently support SSL, with varying levels of encryption. In this case, the biller 330 may maintain a database 400 (FIG. 4) in an appropriate server. The active area 430, accessed through the database 400 at a Web site maintained by or for the biller 330, may contain both the bill data 402 and the bill format data 404 for each of its customers, such as customer 390. Payment requests generated by the database 400 may be sent to a payment processor, such as shown at 355. Alternatively, the biller 330 may have in-house payment processing capabilities, in which case the payment processor 355 shown in FIG. 3 would be incorporated within the biller 330. In the case wherein the customer 390 directly logs onto the Web site of the biller 330 to view and/or pay his or her bills for that biller, both the bill summary data and the bill detail data may be available from the bill summary tables 432 and the bill detail tables 434 stored in the active area 430 of the biller's database 400.

In the case wherein many billers entrust their billing data to a thick consolidator, such as shown at 350 in FIG. 3, the thick consolidator may maintain a database similar to that shown at reference 400 in FIG. 4. Customers, such as customer 370 may log onto an Internet Web site (graphically represented at 352) maintained by the thick consolidator 350, through an HTML SSL, for example. As the billers 310, 320 contracting with the thick consolidator 350 may entrust both their bill data 402 and their bill format data 404 thereto, the billers' corporate identities (as embodied within the look-and-feel of the billers' bills) are preserved at the thick consolidator's site, as rendered by the customer's Web browser software (or other functionally similar visualization means). In the case wherein the customer 370 logs onto the Web site of the thick consolidator 350 to view and/or pay his or her bills for one or more billers having contracted with the thick consolidator 350, both the bill summary data and the bill detail data may be available from the bill summary tables 432 and the bill detail tables 434 maintained in the active area 430 of the thick consolidator's 350 database 400. Any payment requests generated by the electronic bill presentment and payment database 400 maintained by or for the thick consolidator 350 may be sent to a payment processor, such as shown at 355. The payment processor may then process the payment request(s), and appropriately debit the customer's 370 account(s) and credit the biller's 310, 320 accounts in due course. Alternatively, the thick consolidator 350 may incorporate payment-processing capabilities in-house.

The present invention is also readily applicable to so-called thin consolidators, such as shown at 360 in FIG. 3. In this case, the thin consolidator 360 may maintain a database similar to that shown at reference 400 in FIG. 4. Customers, such as customer 380, may log onto the Internet Web site maintained by the thin consolidator 360 (as graphically represented at 362) through an HTML SSL, for example. The billers 310, 320 contracting with the thin consolidator 360 may entrust their bill data 402 (and optionally their bill format data 404 also) thereto. In so doing, the billers' corporate identities, as embodied by the look-and-feel of their bills, may be preserved at the thin consolidator's 360 site, as rendered by the customer's 380 Web browser software (or other functionally similar visualization means). In the case wherein the customer 380 logs onto the Web site 362 of the thin consolidator 360 to view and/or pay his or her bills for one or more billers having contracted with the thin consolidator 360, at least the bill summary data may be available from the bill summary tables 432 maintained in the active area 430 of the thin consolidator's 360 database 400. In the case wherein the thin consolidator 360 also maintains bill detail tables 434 within its database 400, detailed bill data may also be available. According to an embodiment of the present invention, the thin consolidator 360 may also maintain a customer-accessible link to the billers 310, 320 to provide the customer 380 with detail bill data, customer service or other customer services. For example, the thin consolidator 360 may maintain a customer-specific Universal Resource Locator (URL) to the billers' Web site, some other effective means of contacting the billers 310, 320. According to the present invention, the thin consolidator may include a URL linking the customer 380 directly into a Web page containing the customer's 380 (detailed) billing data, thereby conveniently providing the customer 380 with detailed bill information independently of the thin consolidator 360. Any payment requests generated by the electronic bill presentment and payment database 400 maintained by or for the thin consolidator 360 may be sent to a payment processor, such as shown at 355. The payment processor 355 may then process the payment request(s), and appropriately debit the customer's 380 account(s) and credit the biller's 310, 320 accounts. Alternatively, the thin consolidator 360 may incorporate payment-processing capabilities in-house.

It is understood that communications channels other than those shown in the figures may be substituted for the Internet, which is symbolically referenced in FIG. 3 at 340. For example, the large amount of data exchanged between consolidators 350, 360 and large volume billers 310, 320 may be well suited to other high-bandwidth data channels, such as dedicated leased lines, for example.

Figure 2:
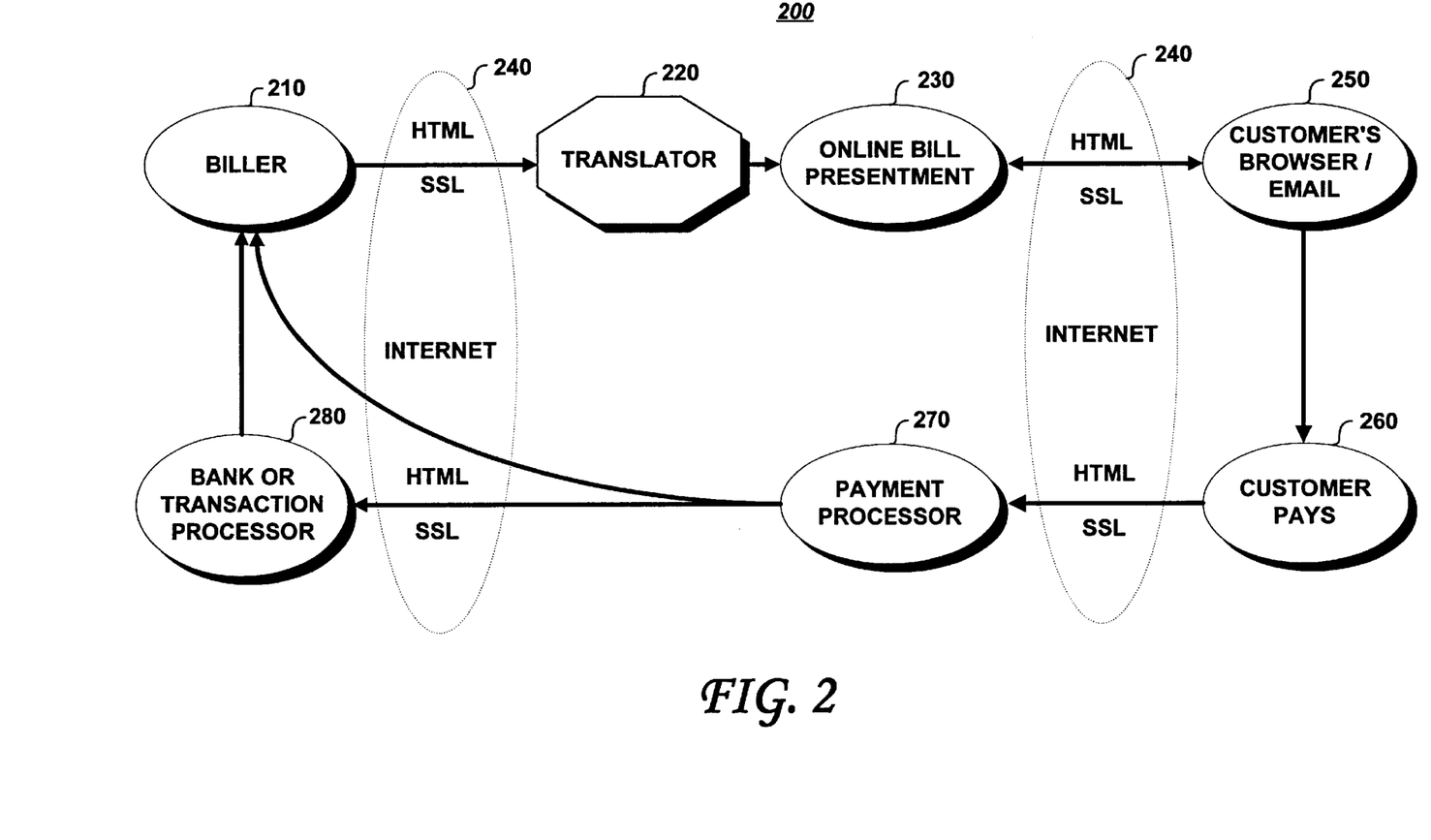
FIG. 2 shows an electronic bill generation and payment cycle, according to an embodiment of the present invention.

FIG. 2 illustrates an electronic bill generation and payment cycle 200, according to an embodiment of the present invention. As shown therein, a biller 210 may electronically submit bill data 402 and/or bill format data 404 to a translator 220 to transform the data in a format appropriate for storage in the electronic bill presentment and payment database 400 of FIG. 4. The translator 220 may be embodied as an Application Program Interface (API), for example. For example, the translator 220 may convert legacy bill data into OFX-compatible data. A customer, through his or her browser or email software 250, for example, may then log on the biller or consolidator's site via, for example an HTML SSL over the Internet 240 and view and/or pay the online bills, as shown at 260. A request for payment may then be generated by the biller and/or consolidator and optionally sent to a payment processor 270. The payment processor 270, in turn, may request (via an HTML SSL over the Internet 240, for example) that a bank or other transaction processor 280 debit the customer's relevant account and credit the biller's account. As financial transactions now rely less upon the movement of currency and more on the movement of data, bankers increasingly come to resemble information processors and information processors increasingly come to resemble bankers. Therefore, as shown in FIG. 2, the bank 280 may be bypassed altogether, and the payment processor may remit the processed customer payments directly to the biller 210, again through the Internet or some other secure communication channel.

Figure 6:
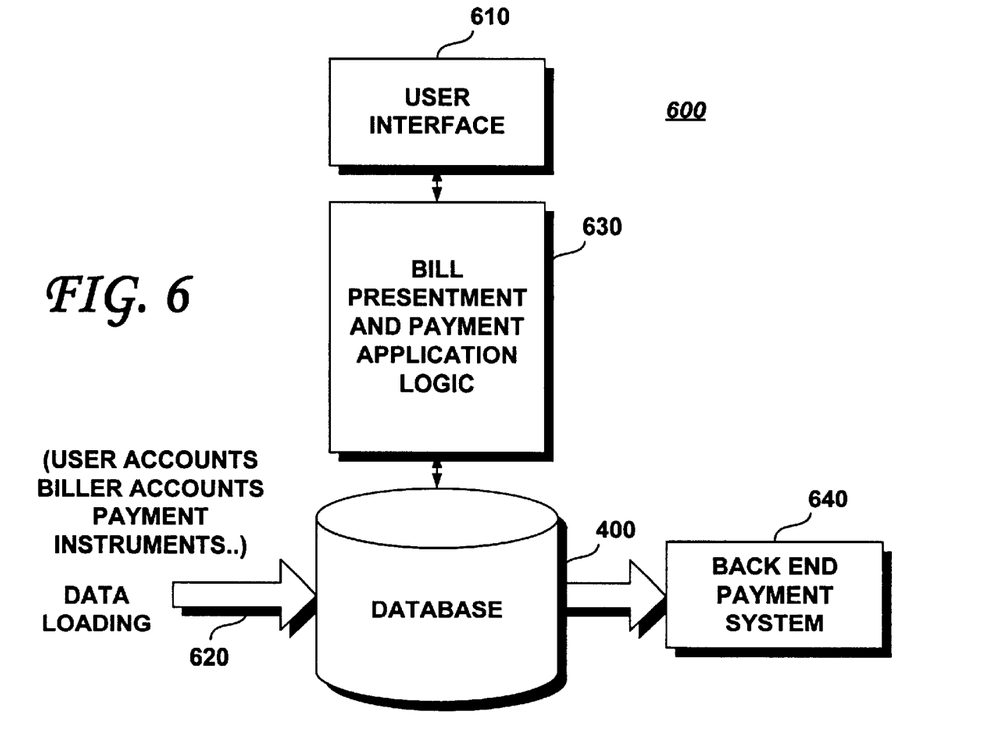
FIG. 6 is a block diagram of a system architecture for managing the database of FIG. 4, according to an embodiment of the present invention.

FIG. 6 is a block diagram of a system architecture 600 for managing the database of FIG. 4, according to an embodiment of the present invention. As shown, the database 400 (corresponding to the database 400 of FIG. 4) is coupled to the bill presentment and payment application logic 630, which interfaces customers, billers and administrators with the database 400 and controls the movement of data between the staging, active and archiving regions therein, as described relative to FIG. 4. The logic 630 preferably includes presentment logic for presenting the formatted online customer bill 550 to the customers via the user interface 610 by accessing the active area 430 and/or the archive area 440. The bill presentment and application logic 630 also includes enrollment logic for enrolling a plurality of customers simultaneously in a batch mode (as symbolized at reference 620) and payment logic for instructing a back end payment system 640 to make the customer-ordered payments at customer selected times and using customer selected payment instruments. The back end payment system 640 may be coupled to the application logic 630 via an appropriate back end payment application program interface (not shown). For example, the back end payment system 640 may include such payment processors as CyberCash, VeriFone and the like. The back end payment system 640 processes credit card and transfers between bank accounts, but is not limited to these payment instruments. The application logic 630 may also include logic for generating reports to billers and administrators at scheduled intervals, or upon demand.

The bill presentment and payment application logic 630 preferably includes a number of services, including enrollment and user profile management discussed above, as well as bill template management (described relative to FIG. 5), audit trailing and activity logging, for example. The audit trailing functionality allows a log to be kept on all activities that affect the database 400, at the table level. In effect, a history is kept of all table-affecting events within the database 400. This allows supervisory oversight and allows any erroneous action or fraudulent activity to be readily undone. Activity logging, on the other hand, logs all or selected business events, such as customer registrations, payments made, notifications sent and/or similar business events. Based upon the events recorded in the activity log, a notification may be sent to a predetermined party or parties, advising them of the occurrence of a specified business event. Such notification may take any form, such as a facsimile transmission, e-mail, pager, etc.

Hardware Overview

Figure 7:
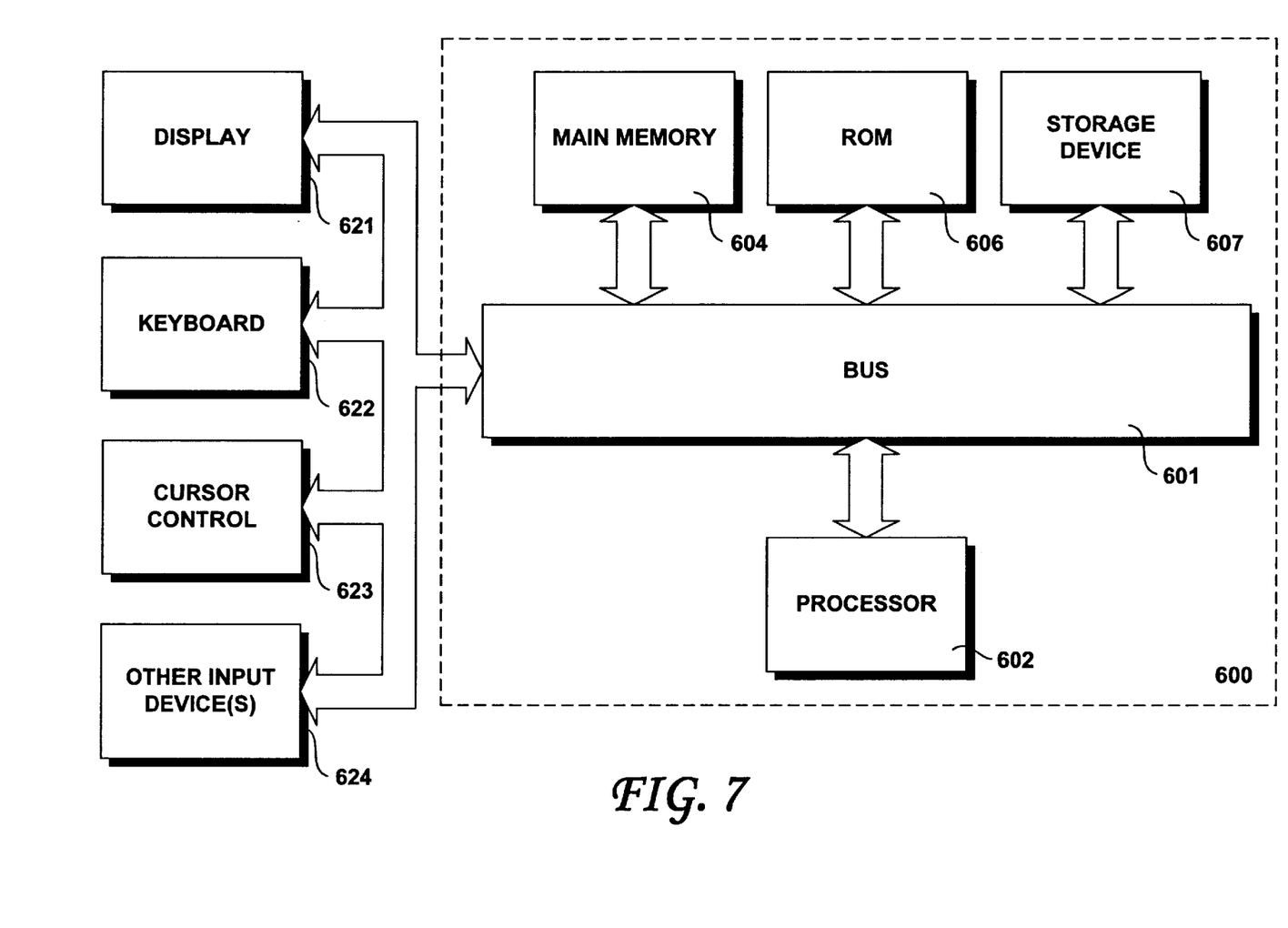
FIG. 7 is a block diagram of a computer on which embodiments of the present invention may be implemented.

FIG. 7 is a block diagram of a computer 700 on which embodiments of the present invention may be implemented. Computer system 700 includes a bus 701 or other communication mechanism for communicating information, and a processor 702 coupled with bus 701 for processing information. Computer system 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computer system 700 also includes a read only memory (ROM) and/or other static storage device 706 coupled to bus 701 for storing static information and instructions for processor 702. A data storage device 607, such as a magnetic disk or optical disk, is coupled to bus 701 for storing information and instructions.

Computer system 700 may also be coupled via bus 701 to a display device 721, such as a cathode ray tube (CRT), for displaying information to a computer user. An alphanumeric input device 722, including alphanumeric and other keys, is typically coupled to bus 701 for communicating information and command selections to processor 702. Another type of user input device is cursor control 723, such as a mouse, a trackball, or cursor direction keys for communicating direction information and command selections to processor 702 and for controlling cursor movement on display 721. This input device typically has two degrees of freedom in two axes, a first axis (e.g., x) and a second axis (e.g., y), which allows the device to specify positions in a plane. Alternatively, other input devices 724, such as a fingerprint reader, a retina scanner and/or other biometric information measuring and/or acquiring devices may be included to assist in the authentication of customers 370, 380 and 390 to the electronic bill presentment and payment database 400. Alternately still, a stylus or pen may be used to interact with the display.

The present invention is drawn to the use of computer system 700 to provide methods and systems for electronic bill presentment and payment over a computer network, such as the Internet. According to one embodiment, the methods according to the present invention are implemented by one or more computer systems 700 in response to processor(s) 702 executing sequences of instructions contained in memory 704. Such instructions may be read into memory 704 from another computer-readable medium, such as data storage device 707. Execution of the sequences of instructions contained in memory 704 causes processor(s) 702 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

It is believed that implementation of the present invention has several advantages over traditional paper-based bill presentation and payment schemes. Indeed, the present invention reduces the processing and administrative costs of the billers, bill publishers and bill consolidators by foregoing paper in favor of an electronic medium. The present invention also reduces the need for paper-based postage and metering, and reduces the time required for delivery of the bill to its intended recipient. Thanks to the automatic bill payment feature of he present invention, late payments of bills may be reduced, resulting in savings for both billers and customers. The present invention also presents novel opportunities and an infrastructure for cross selling, marketing and promotion of complementary products by incorporating targeted advertising, for example, directly on the customer's bill. Moreover, the dynamic template generation system 500 according to the present invention affords billers and consolidators to maintain and promote their corporate identity by customizing the look-and-feel of their online bills.

While the foregoing detailed description has described preferred embodiments of the present invention, it is to be understood that the above description is illustrative only and not limiting of the disclosed invention. For example, the format of the bill data 402 and bill formatting data 404 may be different from those disclosed herein without, however, departing from the scope of the present invention. Moreover, the Internet, as the term is used herein, includes all types of computer networks, whether public, private or hybrid. Additionally, although customer access to the bill presentment and payment database 400 has been described in terms of browser software and/or email clients, it is understood that all means of accessing the database 400 fall within the purview of the present invention. Those of skill in this art will recognize other alternative embodiments and all such embodiments are deemed to fall within the scope of the present invention. Thus, the present invention should be limited only by the claims as set forth below.

What is claimed is:

1. A computer implemented method of presenting an electronic bill from a biller to a customer over a computer network, said method comprising the steps of:

receiving biller-originated bill data and biller-originated bill format data over the network into a bill presentment and payment database;

storing the received biller-originated bill data and biller-originated bill format data in a first area of said bill presentment and payment database;

validating at least said stored biller-originated bill data;

swapping the validated biller-originated bill data and the biller-originated format data from the first area to a second area of said bill presentment and payment database, said second area being accessible to the customer; and presenting the bill to the customer, the presented bill being formatted according to said biller-originated format data and incorporating said validated biller-originated bill data.

2. The computer-implemented method of claim 1, further comprising archiving the bill in a third, customer accessible area of the bill presentment and payment database.

3. The computer-implemented method of claim 1, wherein said bill format data includes a plurality of bill templates, each of said bill templates defining a distinct appearance for said bill.

4. The computer-implemented method of claim 3, wherein said computer-implemented method further comprises the steps of:

evaluating a plurality of bill template selection rules based upon said validated bill data; and selecting one of said plurality of bill templates to format the bill presented to the customer.

5. The computer-implemented method of claim 4, wherein one of the bill template selection rules compares a current date with a due date of the bill.

6. The computer-implemented method of claim 3, wherein at least one of the plurality of bill templates includes at least one of HTML-formatted data, XML-formatted data and Java-based logic.

7. The computer-implemented method of claim 1, wherein the bill data is formatted according to the OFX protocol.

8. The computer-implemented method of claim 1, further comprising the step of evaluating a plurality of auto pay rules to determine whether a request for payment should be automatically generated after the validated bill data and the format data has been swapped from the first area to a second area of said bill presentment and payment database.

9. The computer-implemented method of claim 1, wherein said bill data is arranged in said first area as at least one database table, said at least one database table being swapped into said second area after at least the bill data is validated.

10. The computer-implemented method of claim 9, wherein said at least one database table includes a bill summary table and a bill detail table.

11. The computer-implemented method of claim 1, further comprising the step of generating a status table for the bill, said status table indicating a status of the bill.

12. The computer-implemented method of claim 1, wherein both the bill data and bill format data originate from a plurality of billers, each biller of the plurality inputting its own bill data and its own biller-specific bill format data.

13. The computer-implemented method of claim 1, wherein one of said bill data and said bill format data includes a URL to a Web site maintained by said biller.

14. The computer-implemented method of claim 1, wherein said validating step includes a step of insuring a completeness and an integrity of the bill data.

15. The computer-implemented method of claim 1, wherein the presenting step presents the electronic bill to the customer in a format readable by a device adapted to remotely access the second area of said bill presentment and payment database over the computer network.

16. The computer-implemented method of claim 1, wherein said computer network includes the Internet.

17. The computer implemented method of claim 1, further comprising the step of maintaining an activity log of biller-specified predefined business events and generating a notification upon an occurrence of one of the biller-specified predefined business events.

18. The computer-implemented method of claim 1, further comprising the step of maintaining an audit trail record of all or selected table-affecting events within the bill presentment and payment database.

19. The computer-implemented method of claim 1, wherein each customer is represented in the bill presentment and payment database as a user account, each user account including a biller account for each biller from whom the customer receives bills, a list of which payment instruments the customer uses to pay the billers and at least one biller-definable flexible field.

20. The computer-implemented method of claim 1, wherein a plurality of customers are registered into the bill presentment and payment database in a batch mode by loading XML or OFX-formatted customer data into the first area via Hypertext Transfer Protocol (http) or by file transfer, via File Transfer Protocol (ftp).

21. A computer system, comprising:
    at least one processor;
    at least one data storage device;
    a plurality of processes spawned by said at least one processor, the processes including processing logic for presenting an electronic bill from a biller to a customer over a computer network, said processing logic defining the steps of:
      receiving biller-originated bill data and biller-originated bill format data over the network into a bill presentment and payment database;
      storing the received biller-originated bill data and biller-originated bill format data in a first area of said bill presentment and payment database;
      validating at least said stored biller-originated bill data;
      swapping the validated biller-originated bill data and the biller-originated format data from the first area to a second area of said bill presentment and payment database, said second area being accessible to the customer; and
      presenting the bill to the customer, the presented bill being formatted according to said biller-originated format data and incorporating said validated biller-originated bill data.

22. The computer system of claim 21, further comprising archiving the bill in a third, customer accessible area of the bill presentment and payment database.

23. The computer system of claim 21, wherein said bill format data includes a plurality of bill templates, each of said bill templates defining a distinct appearance for said bill.

24. The computer system of claim 23, wherein said processing logic further defines the steps of:
    evaluating a plurality of bill template selection rules based upon said validated bill data; and
    selecting one of said plurality of bill templates to format the bill presented to the customer.

25. The computer system of claim 24, wherein one of the bill template selection rules compares a current date with a due date of the bill.

26. The computer system of claim 23, wherein at least one of the plurality of bill templates includes at least one of HTML-formatted data, XML-formatted data and Java-based logic.

27. The computer system of claim 21, wherein the bill data is formatted according to the OFX protocol.

28. The computer system of claim 21, wherein the processing logic further defines the step of evaluating a plurality of auto pay rules to determine whether a request for payment should be automatically generated after the validated bill data and the format data has been swapped from the first area to a second area of said bill presentment and payment database.

29. The computer system of claim 22, wherein at least one of said first, second and third areas of said bill presentment and payment database is configured as a database.

30. The computer system of claim 21, wherein said bill data is arranged in said first area as at least one database table, said at least one database table being swapped into said second area after at least the bill data is validated.

31. The computer system of claim 30, wherein said at least one database table includes a bill summary table and a bill detail table.

32. The computer system of claim 21, wherein said processing logic further defines the step of generating a status table for the bill, said status table indicating a status of the bill.

33. The computer system of claim 21, wherein both the bill data and bill format data originate from a plurality of billers, each biller of the plurality inputting its own bill data and its own biller-specific bill format data.

34. The computer system of claim 21, wherein one of said bill data and said bill format data includes a URL to a Web site maintained by said biller.

35. The computer system of claim 21, wherein said validating step includes a step of insuring a completeness and an integrity of the bill data.

36. The computer system of claim 21, wherein the presenting step presents the electronic bill to the customer in a format readable by a device adapted to remotely access the second area of said bill presentment and payment database over the computer network.

37. The computer system of claim 21, wherein said computer network includes the Internet.

38. The computer system of claim 21, further comprising the step of maintaining an activity log of biller-specified predefined business events and generating a notification upon an occurrence of one of the biller-specified predefined business events.

39. The computer system of claim 21, wherein the processing logic further defines the step of maintaining an audit trail record of all or selected table-affecting events within the bill presentment and payment database.

40. The computer system of claim 21, wherein the processing logic defines each customer in the bill presentment and payment database as a user account, each user account including a biller account for each biller from whom the customer receives bills, a list of which payment instruments the customer uses to pay the billers and at least one biller-definable flexible field.

41. The computer system of claim 21, wherein the processing logic is configured to register a plurality of customers into the bill presentment and payment database in a batch mode by loading XML or OFX-formatted customer data into the first area via Hypertext Transfer Protocol (http) or by file transfer, via File Transfer Protocol (ftp).

42. A machine-readable medium having data stored thereon representing sequences of instructions which, when executed by a computer, causes said computer to perform the steps of:

receiving biller-originated bill data and biller-originated bill format data over the network into a bill presentment and payment database;

storing the received biller-originated bill data and biller-originated bill format data in a first area of said bill presentment and payment database;

validating at least said stored biller-originated bill data;

swapping the validated biller-originated bill data and the biller-originated format data from the first area to a second area of said bill presentment and payment database, said second area being accessible to the customer; and presenting the bill to the customer, the presented bill being formatted according to said biller-originated format data and incorporating said validated biller-originated bill data.

43. The computer readable medium of claim 42, wherein said sequences of instructions further cause said computer to archive the bill in a third, customer accessible, area of the bill presentment and payment database.

44. The computer readable medium of claim 42, wherein said bill format data includes a plurality of bill templates, each of said bill templates defining a distinct appearance for said bill.

45. The computer readable medium of claim 44, wherein said sequences of instructions further cause said computer to carry out the steps of:

evaluating a plurality of bill template selection rules based upon said validated bill data; and selecting one of said plurality of bill templates to format the bill presented to the customer.

46. The computer readable medium of claim 42, wherein said sequences of instructions further cause said computer to carry out the step of evaluating a plurality of auto pay rules to determine whether a request for payment should be automatically generated after the validated bill data and the format data has been swapped from the first area to a second area of said bill presentment and payment database.

47. The computer readable medium of claim 42, wherein said validating step includes a step of insuring a completeness and an integrity of the bill data.

48. The computer readable medium of claim 42, wherein the presenting step presents the electronic bill to the customer in a format readable by a device adapted to remotely access the second area of said bill presentment and payment database over the computer network.

49. The computer readable medium of claim 42, further comprising the step of maintaining an activity log of biller-specified predefined business events and generating a notification upon an occurrence of one of the biller-specified predefined business events.

50. The computer readable medium of claim 42, further comprising the step of maintaining an audit trail record of all or selected table-affecting events within the bill presentment and payment database.

51. The computer readable medium of claim 42, wherein each customer is represented in the bill presentment and payment database as a user account, each user account including a biller account for each biller from whom the customer receives bills, a list of which payment instruments the customer uses to pay the billers and at least one biller-definable flexible field.

52. The computer readable medium of claim 42, wherein a plurality of customers are registered into the bill presentment and payment database in a batch mode by loading XML or OFX-formatted customer data into the first area via Hypertext Transfer Protocol (http) or by file transfer, via File Transfer Protocol (ftp).

* * * * *